United States Patent [19]

Miller, Jr.

[11] 4,313,651

[45] Feb. 2, 1982

[54] OPTICAL BEAM SCANNER

[75] Inventor: Walter E. Miller, Jr., Huntsville, Ala.

[73] Assignee: The United States of America as represented by the Secretary of the Army, Washington, D.C.

[21] Appl. No.: 13,947

[22] Filed: Feb. 22, 1979

[51] Int. Cl.³ .............................................. G02F 1/01
[52] U.S. Cl. ..................................... 350/355; 372/26; 372/12; 372/24
[58] Field of Search ............................. 350/355, 356; 331/94.5 M, 94.5 K, 94.5 Q

[56] References Cited

U.S. PATENT DOCUMENTS

| | | | |
|---|---|---|---|
| 3,367,733 | 2/1968 | Grau | 350/356 |
| 3,447,855 | 6/1969 | Skinner | 350/356 |
| 3,806,834 | 4/1974 | Johnston et al. | 331/94.5 M |
| 4,085,387 | 4/1978 | Asawa et al. | 331/94.5 M |
| 4,174,504 | 11/1979 | Chenausky | 331/94.5 Q |

OTHER PUBLICATIONS

"Direct Demodulation of a 10.6 μm FM Signal With a NH₂D Starkcell", by Abrams et al., *IEEE Jou. of Quantum Electronics*, vol. QE-12, No. 10, pp. 646-647 (Oct. '76).

"Fundamental of Optics", by Jenkins and White, pp. 603-605; second edition.

*Primary Examiner*—William L. Sikes
*Assistant Examiner*—León Scott
*Attorney, Agent, or Firm*—Nathan Edelberg; Robert P. Gibson; Freddie M. Bush

[57] ABSTRACT

The optical beam scanner employs novel utilization of the well known Stark effect. By means of an external applied voltage, a change in the index of refraction of an optical medium is produced. This produces a bending effect on light transmitted through the medium. Varying the applied voltage can be used to vary the refractive index, or a refractive index gradient may be produced by providing a gradient in the applied field, to produce no moving parts scanning of the optical beam.

10 Claims, 10 Drawing Figures

OPTICAL BEAM SCANNER

DEDICATORY CLAUSE

The invention described herein may be manufactured, used, and licensed by or for the Government for governmental purposes without payment to me of any royalties thereon.

BACKGROUND OF THE INVENTION

Optical scanning is usually accomplished by one of two simple mechanical means. These are, a moveable mirror which produces a scan angle, which is twice the mirror movement angle, and a moveable prism which provides a similar but non linear beam scan function. Optical energy from an optical source impinges on the mirror or the prism and is redirected as the moveable member oscillates. Both of these methods require a moving optical element to accomplish the angular beam scan, which results in inherent limitations on upper scan frequency as well as suffering from the effects of friction and wear. A description on prisms as dispersors is found in Williams and Becklund, "Optics, a Short Course for Engineers and Scientists", Wiley-Interscience 1972, pages 251–254.

FIGS. 1 and 2 show a typical circuit for and the phenomena associated with the inverse Stark effect. The inverse Stark effect utilizes absorption spectra instead of emission spectra as in the Stark effect. The apparatus in FIG. 1 is comprised of a line spectra optical source 10, such as a laser. The output light beam 12 traverses Stark cell 14 and emerges as output 16. The Stark cell is filled with an optical medium which has an absorption line at the frequency $\nu_0$, near the source emission frequency at $\nu_1$. Closing switch 18 applies voltage from battery or power supply 20 to capacitor plates 21 and 22, thus producing an electric field across the Stark cell. This electric field splits the absorption line of the cell medium and the resulting shift in absorption frequency is typically used to absorb the input light and thereby amplitude modulate the output light. Switch 18 may obviously be replaced with an electronic switch to provide higher frequency modulation. This prior art is well known to those technically versed in the field.

FIG. 2 illustrates the physical phenomena of the inverse Stark effect. The Stark cell medium 14 possesses an absorption line spectra, one line of which is shown at A. The index of refraction, $\mu$, near this absorption line is shown at B; the negative slope portion of this curve is known as anomalous dispersion. In an electric field, this absorption line of A may be made to split as shown in C. In general, the stronger the applied voltage the wider the separation of these two absorption lines. The index of refraction is also altered as shown at D. The symbol $\nu$ represents the optical wave number (proportional to frequency). Anomalous dispersion and the Stark effect are described in Jenkins and White, "Fundamentals of Optics", McGraw-Hill, 1957.

As shown in FIG. 2, if light of frequency $\nu_1$ or $\nu_2$, is provided by source 10 and Stark cell 14 has the absorption lines of A and C in the absence and presence respectively of an electric field, strong amplitude modulation is produced at output 16. Prior art provides for mechanical beam scanning with moving elements such as mirrors or prisms and for amplitude modulation of narrow spectral sources using the tunable selective absorption of Stark cells.

SUMMARY OF THE INVENTION

The optical beam scanner is a no-moving-parts beam scanner using the variable refractive index properties of the Stark cell. This allows scanning to be accomplished simply by varying the applied voltage across the cell.

DESCRIPTION OF THE PREFERRED EMBODIMENT

Figure 1:
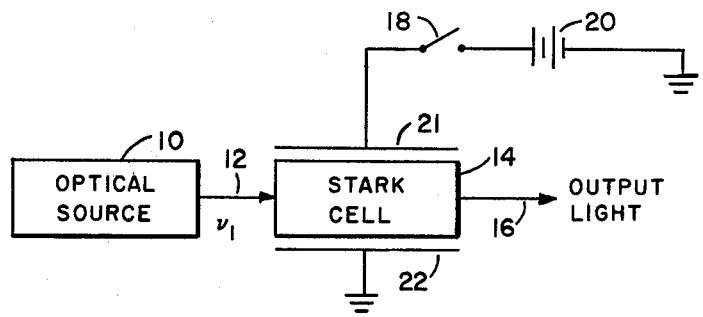
FIG. 1 is a schematic of typical inverse Stark effect apparatus established in the prior art.
Figure 2:
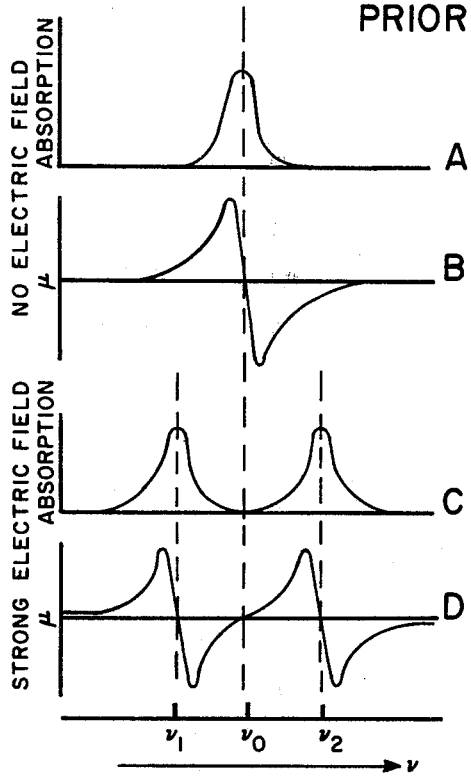
FIG. 2 illustrates the physical phenomena of the inverse Stark effect.
Figure 4:
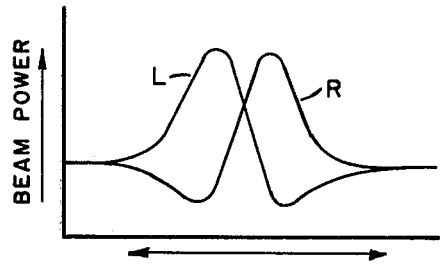
FIGS. 4–8 show the output beams of the apparatus of FIG. 3 as modulated voltage sources vary.
Figure 5:
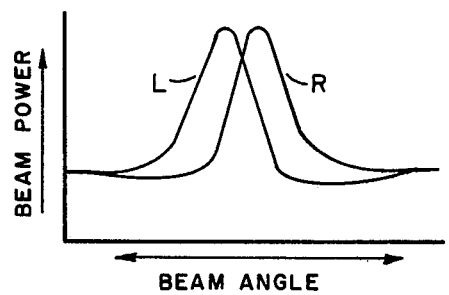
Figure 3:
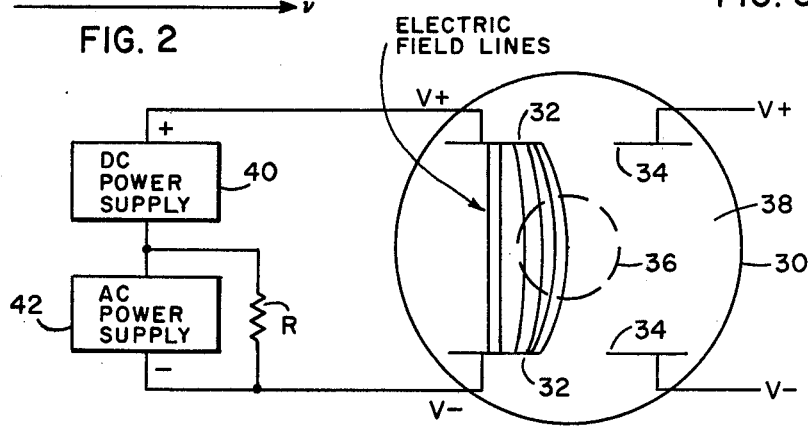
FIG. 3 is a partial schematic of a Stark cell cross section adapted for independent modulation from two sources.
Figure 6:
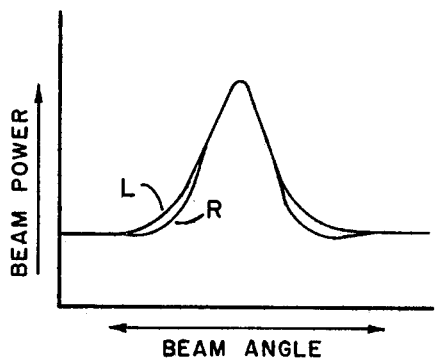
Figure 7:
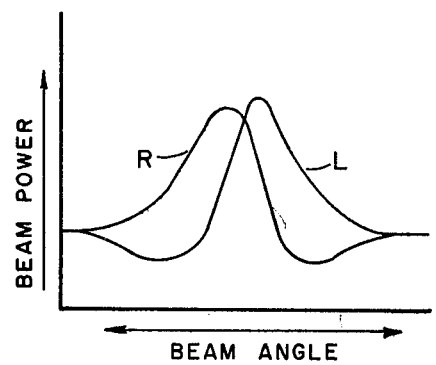
Figure 8:
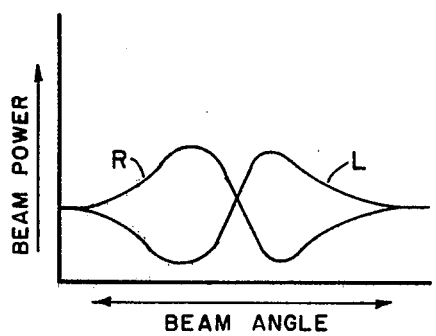

Referring now to the drawings wherein like numbers represent like parts, FIG. 3 shows the configuration of a modified Stark cell which was used in the discovery of practical beam bending effects. This cell 30 has split capacitors 32 and 34 to independently modulate with conventional AM modulation the right and left halves of a laser beam. Varying the electric field developed between the capacitor plates allows the beam to be modulated. An input laser beam 36 shown in dashed lines is passed through the Stark absorbing medium 38. A direct current (DC) power source 40 and an AC power source 42 are coupled to capacitor 32. A similar power system (not shown) is coupled to capacitor 34. Optical energy was provided from a $CO_2$ wave guide laser. Ammonia gas was utilized as the Stark absorbing medium. The $CO_2$ laser used a carbon isotope to shift the laser line to 10.7 microns in order to be compatible with the Ammonia inverse Stark effect. The two capacitors received a DC bias voltage (approximately 1,000 volts) to shift the Stark absorbing line nearer the laser line, plus an AC voltage (approximately 100 volts) to provide conventional on-off modulation independently in the two halves of the laser beam. This allowed two separate and distinct output frequencies (those of the two AC power sources) to be generated. As DC bias voltages and AC modulating voltages were adjusted, the unexpected phenomena of FIGS. 4–8 resulted. The left most beam L (first frequency) in FIG. 4 moved to the right, and the right most beam R (second frequency) moved toward the left as shown in FIG. 5 with an increase in one of the DC voltages. Further increase in this DC voltage superimposed the dual modulated beam (FIG. 6), and still further increases caused the reversed orientations of FIGS. 7 and 8. This angular scanning of the output beam portions results from variation of the index of refraction gradient induced in the Stark cell medium by variation of the electric field gradient caused by the two DC power supply voltages. The AC power supplies were used to separately modulate the two halves of the laser beam, and thus allow far field identification of each beam half. This separate AC modulation is unnecessary to a single beam scanning device, and a single power supply, which may be variable, is employed.

Figure 9:
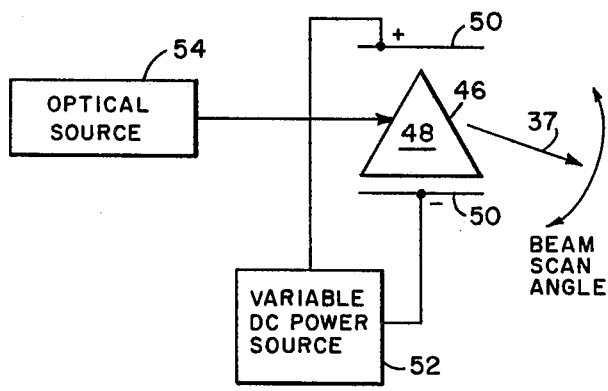
FIG. 9 is a preferred embodiment of the optical beam scanner for scanning a single beam with no moving parts.

A preferred embodiment of an optical scanner is shown in FIG. 9. A prism housing 46 is filled with an appropriate medium 48, such as ammonia gas, for Stark cell operation and is placed between the capacitor plates 50. Typically, housing 46 may have the shape of a pentahedron. A voltage source 52 is coupled across the capacitor and an optical source 54 is adapted for directing optical energy such as laser light, through the prism 46. As the voltage on the capacitor plates vary, the index of refraction varies, thus varying the prism dispersion. Voltages used are slightly lower than those used for AM modulation, so only a slight absorption occurs on the skirt of the absorption band. A very simple and effective scanner results. Absorption losses are thus minimized by use of normal dispersion rather than anomalous dispersion portions of the refractive index curve.

In operation, optical energy from source 54 is coupled through prism housing 46 to provide an output beam at an angle with respect to the line of the input beam. The variable power supply is adjusted to provide a strong electrical field across capacitor 50 and the Stark medium 48 within prism 46. As the power supply is varied back and forth across a center or reference voltage output $V_0$ the electric field varies across the Stark cell. The Stark medium shifts the absorption lines (and thus the refractive index near the optical source frequency) as the voltage changes incrementally causing the output beam to scan back and forth across an angle in response to changes in the voltage applied across the cell. Scan angles of several degrees are readily achieved.

Figure 10:
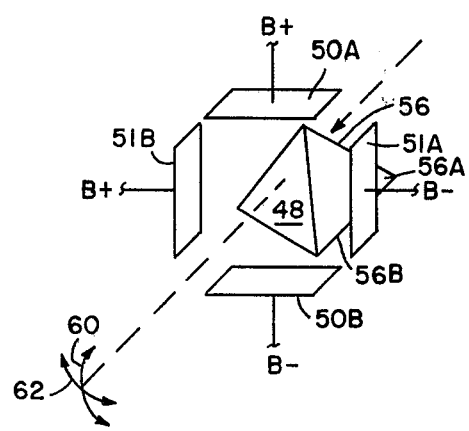
FIG. 10 is an embodiment of the Stark cell having two sets of parallel plates disposed for scanning an optical beam in two planes.

FIG. 10 shows a Stark cell housing 56 disposed between two sets of parallel plates, plate 50A and 50B and plates 51A and 51B and filled with medium 48. This allows the field to be developed from different planes across the Stark cell and thereby allows the beam to be scanned in either one of the two planes 60 or 62 controlled by the parallel plates. Typically, for this particular embodiment, housing 56 will have the shape of a tetrahedron having sides 56A and 56B perpendicular and the remaining two sides sloped to complete the housing, surface 56A being parallel to capacitor plate 51A and surface 56B being parallel to capacitive plate 50B.

Although the present invention has been described with reference to the preferred embodiments, workers skilled in the art will recognize that changes may be made in form and detail without departing from the spirit and scope of the invention. Accordingly, the scope of the invention should be limited only by the claims appended hereto.

I claim:

1. A method for providing a scanned optical beam of light comprising the steps of:
   directing a beam of light to be scanned along a fixed path into an optical medium having a variable index of refraction;
   applying an electric field to at least one pair of parallel capacitive plates and across said medium for changing the refractive index;
   varying said electric field applied across said medium so that an electric field gradient is developed at edges of said parallel pairs of capacitive plates said beam of light being directed between corresponding pairs of said capacitive plates and along the edges of said plates within the region of said gradient for causing the refractive index to change as said field varies, thereby scanning said beam; developing a variable voltage between said capacitive plates for applying said variable electric field across said medium; and varying the refractive index of said optical medium using the inverse Stark effect, for providing beam scanning through a scan angle while maintaining said optical medium fixed with respect to the light beam.

2. A method for providing a scanned optical beam of light as set forth in claim 1 and further comprising the steps of changing said variable voltage incrementally to either side of a center voltage output; and shifting absorption lines of the inverse Stark effect medium only near a frequency of said beam of light by said incremented voltage changes.

3. An optical beam scanner having no moving parts for directing a beam of light along a scan path and comprising: a housing means in the path of said beam of light for directing said beam therethrough, an inverse Stark effect medium having a variable refractive index and disposed within said housing in the path of said beam of light, means for providing a variable electric field across said inverse stark effect medium comprising variable power supply means and a plurality of parallel pairs of capacitive plates disposed selectively around said housing for developing said electric field between parallel pairs of said plates so that an electric field gradient is developed at edges of said parallel pairs of plates, said housing means directing said beam of light between corresponding pairs of said capacitive plates and along the edges of said plates within the region of said field gradient, thereby scanning said beam of light across a beam scan angle controlled by said parallel pairs of capacitive plates developing the electric field between.

4. An optical beam scanner having no moving parts for directing a beam of light along a scan path and comprising: a housing in the path of said beam of light for directing said beam therethrough, an inverse Stark effect medium having a variable refractive index and disposed within said housing in the path of said beam of light, means for providing a variable electric field across said inverse Stark effect medium for directing said beam of light along said scan path as said electric field varies; said means for providing a variable field comprises variable power supply means and a plurality of parallel pairs of capacitive plates disposed selectively around said housing for developing an electric field across said medium between parallel pairs of said plates, said electric field being variable for changing the refractive index of said medium and thereby scanning said beam of light across a beam scan angle controlled by the parallel pairs of capacitive plates developing the electric field therebetween; and wherein said housing is prism shaped and said medium is shaped by the housing.

5. An optical beam scanner as set forth in claim 4 wherein said plurality of parallel pairs of plates are 4 plates, forming first and second parallel pairs of plates which are mutually perpendicular for controlling said beam scan in two perpendicular directions.

6. An optical beam scanner as set forth in claim 4 wherein said plurality of parallel pairs of plates are 2 plates disposed in parallel for controlling said beam scan in one plane.

7. An optical beam scanner as set forth in claim 4 wherein said inverse Stark effect medium is ammonia gas and further comprising a $CO_2$ laser for generating said beam of light.

8. An optical beam scanner as set forth in claim 4 wherein said prism is a pentahedron having respective first and second surfaces in parallel and respective third, fourth, and fifth surfaces non-parallel to complete the housing.

9. An optical beam scanner as set forth in claim 4 wherein said power supply means is adapted to be varied incrementally back and forth across a particular reference voltage output for varying the electric field across the inverse Stark effect medium and thereby shifting absorption lines of the medium near a frequency of said beam of light.

10. An optical beam scanner having no moving parts for directing a beam of light along a scan path and comprising: a housing in the path of said beam of light for directing said beam therethrough, an inverse Stark effect medium having a variable refractive index and disposed within said housing in the path of said beam of light, means for providing a variable electric field across said inverse Stark effect medium for directing said beam of light along said scan path as said electric field varies; said means for providing a variable field comprises variable power supply means and a plurality of parallel pairs of capacitive plates disposed selectively around said housing for developing an electric field across said medium between parallel pairs of said plates, said electric field being variable for changing the refractive index of said medium and thereby scanning said beam of light across a beam scan angle controlled by the parallel pairs of capacitive plates developing the electric field therebetween; and wherein said housing is tetrahedron shaped having first and second surfaces mutually perpendicular and third and fourth surfaces completing the housing, said plurality of parallel pairs of capacitive plates are 4 plates forming first and second pairs of parallel plates which are mutually perpendicular for controlling said beam scan in two perpendicular directions, each of said plates defining a plane, and said first and second perpendicular surfaces lying in respective planes parallel to the planes of respective first and second pairs of parallel plates for controlling the beam direction through said tetrahedron.

* * * * *